(12) United States Patent
Vu et al.

(10) Patent No.: US 8,525,883 B2
(45) Date of Patent: Sep. 3, 2013

(54) METHODS, SYSTEMS AND APPARATUS FOR AUTOMATIC VIDEO QUALITY ASSESSMENT

(75) Inventors: Cuong Vu, Stillwater, OK (US); Sachin G. Deshpande, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 82 days.

(21) Appl. No.: 13/225,216

(22) Filed: Sep. 2, 2011

(65) Prior Publication Data

US 2013/0057703 A1    Mar. 7, 2013

(51) Int. Cl.
*H04N 17/00*    (2006.01)

(52) U.S. Cl.
USPC ........................ 348/180; 348/181; 348/192

(58) Field of Classification Search
USPC ............ 348/180, 181, 192; 375/224, 240.26; 702/189, 71, 81, 190; 382/190, 232, 276
See application file for complete search history.

(56) References Cited

U.S. PATENT DOCUMENTS

| | | | |
|---|---|---|---|
| 6,285,797 B1 | 9/2001 | Lubin et al. | |
| 6,529,552 B1* | 3/2003 | Tsai et al. | 375/240.05 |
| 6,574,279 B1* | 6/2003 | Vetro et al. | 375/240.23 |
| 6,704,451 B1 | 3/2004 | Hekstra et al. | |
| 7,668,397 B2 | 2/2010 | Le Dinh et al. | |
| 7,812,852 B2 | 10/2010 | Sylthe et al. | |
| 2006/0238445 A1* | 10/2006 | Wang et al. | 345/55 |
| 2008/0288211 A1* | 11/2008 | Pastrana et al. | 702/182 |
| 2009/0148058 A1* | 6/2009 | Dane et al. | 382/251 |
| 2009/0274390 A1 | 11/2009 | Meur et al. | |
| 2010/0150459 A1* | 6/2010 | Coulombe et al. | 382/232 |
| 2011/0038548 A1* | 2/2011 | Rezazadeh et al. | 382/199 |
| 2011/0216979 A1* | 9/2011 | Barkol et al. | 382/218 |
| 2011/0255589 A1* | 10/2011 | Saunders et al. | 375/240.01 |
| 2011/0310962 A1* | 12/2011 | Ou et al. | 375/240.03 |
| 2011/0311147 A1* | 12/2011 | Pahalawatta et al. | 382/197 |
| 2012/0281924 A1* | 11/2012 | Coulombe et al. | 382/218 |

FOREIGN PATENT DOCUMENTS

| | | |
|---|---|---|
| EP | 1995978 A1 | 11/2008 |
| WO | 00/62556 A1 | 10/2000 |
| WO | 2004114216 A1 | 12/2004 |

OTHER PUBLICATIONS

International Search Report—PCT/JP20121066457—Mailing Date Sep. 18, 2012.
Zhou Wang, A. Bovik, H. Sheikh, and E. Simoncelli, "Image quality assessment: From Error Visibility to Structural Similarity," IEEE Transactions on Image Processing, Apr. 2004, pp. 1-14, vol. 13, No. 4, IEEE Signal Processing Society.

(Continued)

*Primary Examiner* — Victor Kostak
(74) *Attorney, Agent, or Firm* — Kristine Elizabeth Matthews; David C. Ripma (57) ABSTRACT

Aspects of the present invention are related to systems, methods and apparatus for automatic quality assessment of a video sequence. According to a first aspect of the present invention, a quality index may be generated by combining a spatial quality index and a temporal quality index. According to a second aspect of the present invention, a spatial quality index may be calculated using a modified exponential moving average model to pool multi-scale structural similarity indices computed from test frame—reference frame pairs. According to a third aspect of the present invention, a temporal quality index may be generated by averaging multi-scale structural similarity indices computed from difference image pairs, wherein one difference image is formed between reference frames and another difference image is formed between a reference frame and a test frame.

19 Claims, 5 Drawing Sheets

(56) References Cited

OTHER PUBLICATIONS

K. Seshadrinathan, R. Soundarajan, A. Bovik, and L. Cormack, "Study of Subjective and Objective Quality Assessment of Video," IEEE Transactions on Image Processing, Jun. 2009, pp. 1-16, vol. 19, No. 6, IEEE Signal Processing Society.

M. Pinson and S. Wolf, "A New Standardized Method for Objectively Measuring Video Quality," IEEE Transactions on Broadcasting, Sep. 2004, pp. 1-12, vol. 50, No. 3, IEEE Signal Processing Society.

K. Seshadrinathan and A. Bovik, "Motion Tuned Spatio-temporal Quality Assessment of Natural Videos," IEEE Transactions on Image Processing, Feb. 2010, pp. 1-16, vol. 19, No. 2, IEEE Signal Processing Society.

VQEG, "Final Report From the Video Quality Experts Group on the Validation of Objective Models of Video Quality Assessment, Phase II" Aug. 25, 2003, pp. 1-68, http://vqeg.org.

Zhou Wang, E. Simoncelli, and A. Bovik, "Multi-scale Structural Similarity for Image Quality Assessment," Conference Record of the Thirty-Seventh Asilomar Conference on Signals, Systems and Computers, Nov. 9-12, 2003, pp. 1-5, vol. 2.

S. Chikkerur, V. Sundaram, M. Reisslein, and L. J. Karam, "Objective Video Quality Assessment Methods: A Classification, Review, and Performance Comparison," IEEE Transaction on Broadcasting, Jun. 2011, pp. 165-182, vol. 57, No. 2, IEEE Signal Processing Society.

D. M. Chandler and S. S. Hemami, "VSNR: A Wavelet-Based Visual Signal-to-Noise Ratio for Natural Images," IEEE Transaction on Image Processing, Sep. 2007, pp. 2284-2298, vol. 16, No. 9, IEEE Signal Processing Society.

E. C. Larson and D. M. Chandler, "Most apparent distortion: full-reference image quality assessment and the role of strategy," Journal of Electronic Imaging, Jan.-Mar. 2010, pp. 011006-01-011006-21, vol. 19, No. 1, SPIE.

* cited by examiner

METHODS, SYSTEMS AND APPARATUS FOR AUTOMATIC VIDEO QUALITY ASSESSMENT

FIELD OF THE INVENTION

Embodiments of the present invention relate generally to methods, systems and apparatus for automatically assessing the quality of a video sequence and, in particular, for obtaining a quality index for the video sequence.

BACKGROUND

A measurement of the quality of a video sequence may be important in a video processing system, or other video system. One reliable method for quantifying the quality of a video sequence involves having human subjects rate the quality of the video sequence. However, this method may be time consuming and expensive and, therefore, impractical in some applications. Methods, systems and apparatus, for automatic video quality assessment, that determine a quality measure, for a video sequence, that is highly correlated with a human rating may be desirable.

SUMMARY

Aspects of the present invention are related to systems, methods and apparatus for automatic quality assessment of a video sequence.

According to a first aspect of the present invention, a quality index may be generated by calculating a spatial quality index, calculating a temporal quality index and combining the spatial quality index and the temporal quality index to form a final quality index.

According to a second aspect of the present invention, a spatial quality index may be calculated using a modified exponential moving average model to pool multi-scale structural similarity indices computed from test frame—reference frame pairs.

According to a third aspect of the present invention, a temporal quality index may be generated by averaging multi-scale structural similarity indices computed from difference image pairs, wherein one difference image is formed between reference frames and another difference image is formed between a reference frame and a test frame.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but the detailed description is merely representative of the presently preferred embodiments of the invention.

Elements of embodiments of the present invention may be embodied in hardware, firmware and/or a computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a computer program product comprising a computer-readable storage medium having instructions stored thereon/in which may be used to program a computing system, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

A measurement of the quality of a video sequence may be important in a video processing system, or other video system. One reliable method for quantifying the quality of a video sequence involves having human subjects rate the quality of the video sequence. However, this method may be time consuming and expensive and, therefore, impractical in some applications. Methods, systems and apparatus, for automatic video quality assessment, that determine a quality measure, for a video sequence, that is highly correlated with a human rating may be desirable.

Figure 1:
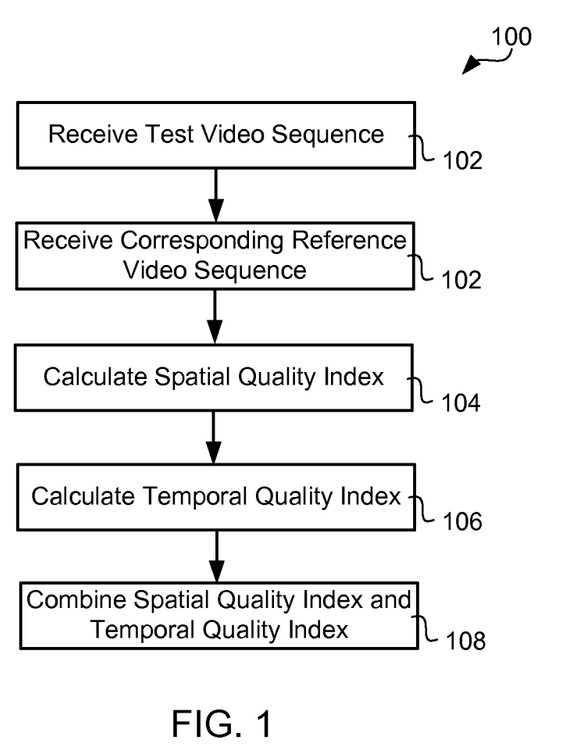
FIG. 1 is a chart showing exemplary embodiments of the present invention comprising calculating a spatial quality index, calculating a temporal quality index and combining the spatial quality index and the temporal quality index to form a final quality index.

Some embodiments of the present invention may be described in relation to FIG. 1. FIG. 1 illustrates exemplary method(s) 100 of video quality assessment according to embodiments of the present invention. In these embodiments, a test video sequence may be received 102 in a processor. The test video sequence may be, for example, a processed video sequence, a degraded video sequence, a decoded video sequence or any video sequence for which a quality assessment may be desired. The test video sequence may comprise a first plurality of temporally related image frames, which may be referred to as test frames. A reference video sequence comprising a second plurality of temporally related image frames, which may be referred to as reference frames, corresponding temporally to the first plurality of image frames in the test video sequence may be received 104 in the processor. A spatial quality index, also considered a spatial quality measure, for the test video sequence, may be calculated 104, in the processor, using the test video sequence and the reference video sequence. A temporal quality index, also considered a temporal quality measure, for the test video sequence, may be calculated 106, in the processor, using the test video sequence and the reference video sequence. The spatial quality index and the temporal quality index may be combined 108, in the processor, to form a final quality index, also considered a final quality measure, for the test video sequence. Exemplary processors may include a computational processing system in a computing system, a computational processing system in a video processing system, a computational processing system in a video encoder, a computational processing system in a video decoder and other processors and computational processing units.

Figure 2:
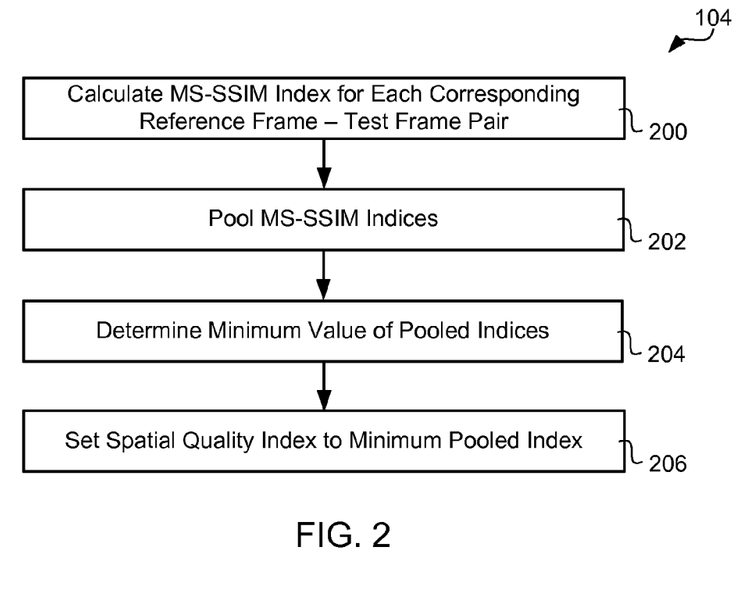
FIG. 2 is a chart showing exemplary embodiments of the present invention comprising calculating a plurality of multi-scale structural similarity (MS-SSIM) indices, pooling the indices and selecting the minimum-valued pooled index as the spatial quality index.

The calculation 104 of the spatial quality index, in some embodiments of the present invention, may be understood in relation to FIG. 2. FIG. 2 illustrates exemplary method(s) 104 of spatial quality index calculation according to embodiments of the present invention. In some embodiments of the present invention, a multi-scale structural similarity (MS-SSIM) index may be calculated 200 for each temporally corresponding test frame and reference frame pair. For each test frame and the temporally corresponding reference frame, a contrast comparison component and a structure comparison component may be determined for a plurality of scales, also considered layers. For a particular layer, m, the test frame and the reference frame may be low-pass filtered and down-sampled m−1 times, and the contrast comparison component for the layer, which may be denoted $c_m(x, y)$, may be computed according to:

$$c_m(x, y) = \frac{2\sigma_{x,m}\sigma_{y,m} + C_2}{\sigma_{x,m}^2 + \sigma_{y,m}^2 + C_2},$$

and the structure comparison component for the layer, which may be denoted $s_m(x, y)$, may be computed according to:

$$s_m(x, y) = \frac{\sigma_{xy,m} + C_3}{\sigma_{x,m}\sigma_{y,m} + C_3},$$

where x and y may denote aligned image patches in the $m^{th}$—layer test frame and reference frame, respectively, and $\sigma_{x,m}$ and $\sigma_{y,m}$ may denote the standard deviation of the luminance of x and y, respectively, and $\sigma_{xy,m}$ may denote the covariance. In some embodiments of the present invention, the aligned patches, x and y, may comprise the entire test frame and reference frame. In alternative embodiments, the aligned patches, x and y, may comprise a fixed-block-size block in the test frame and in the reference frame. A luminance comparison component, which may be denoted $l_M(x, y)$, may be determined only for the highest scale, which may be denoted M, according to:

$$l_M(x, y) = \frac{2\mu_{x,m}\mu_{y,m} + C_1}{\mu_{x,m}^2 + \mu_{y,m}^2 + C_1},$$

where $\mu_{x,m}$ and $\mu_{y,m}$ may denote the mean of the luminance of x and y, respectively. The constants $C_1$, $C_2$ and $C_3$ may be stabilizing terms of the corresponding components. In an exemplary embodiment of the present invention comprising 8 bits-per-pixel luminance images, wherein the dynamic range, which may be denoted L, is equal to 255, the constants $C_1$, $C_2$ and $C_3$ may be determined according to:

$$C_1 = (K_1 L)^2, \ C_2 = (K_2 L)^2 \text{ and } C_3 = \frac{C_2}{2},$$

respectively, where $K_1 \ll 1$ and $K_2 \ll 1$. In an exemplary embodiment, $K_1 = 0.01$ and $K_2 = 0.03$. The components may be combined to generate an MS-SSIM index, for the reference frame—test frame pair, according to:

$$MS\text{-}SSIM(x, y) = [l_M(x, y)]^{\alpha_M} \prod_{m=1}^{M} [c_m(x, y)]^{\beta_m} [s_m(x, y)]^{\gamma_m}.$$

In an exemplary embodiment of the present invention, M=5, $\alpha_M=0.1333$ and $\beta_{m=1,\ldots,5}=\gamma_{m=1,\ldots,5}=[0.0448, 0.2856, 0.3001, 0.2363, 0.1333]$.

The MS-SSIM indices for the reference frame—test frame pairs may be pooled 202 to create a plurality of spatial quality values. In some embodiments of the present invention, the MS-SSIM indices may be pooled using a modified exponential moving average. An initial spatial quality value, which may be denoted $S_1$, may be computed according to:

$$S_1 = \frac{\left(\sum_{i=1}^{p} MSSSIM_i\right)}{p},$$

where $MSSSIM_i$ denotes the MS-SSIM index of the $i^{th}$ temporally located reference frame—test frame pair. For n=1, 2, ..., N−p, where N is the number of frames in each the test video sequence and the reference video sequence, $S_{n+1}$ may be computed according to:

$$S_{n+1} = \alpha \text{MSSSIM}_{n+p} + (1-\alpha) S_n,$$

where $\alpha$ is a smoothing factor which may be, in an exemplary embodiment of the present invention, selected according to:

$$\alpha = \frac{\eta}{(p+1)},$$

where $\eta = 0.25$ and $p = 30$. In some embodiments of the present invention, each $S_n$ may contain information from, at least, half a second of the video, and in each $S_n$, a new frame may not make an immediate strong effect and the contribution of previous frames may not drop too fast. In some embodiments of the present invention, setting $p=30$ and $\alpha$ to a small value may achieve the above-described three constraints on $S_n$.

In some embodiments of the present invention, the spatial quality of the test video sequence may be based on the worst-quality video segment within the test video sequence. In these exemplary embodiments, the minimum value of the pooled MS-SSIM indices may be determined 204, and the spatial quality index, which may be denoted $Q_S$, for the test sequence may be set 206 to the minimum value:

$$Q_S = \min_n S_n.$$

Figure 3:
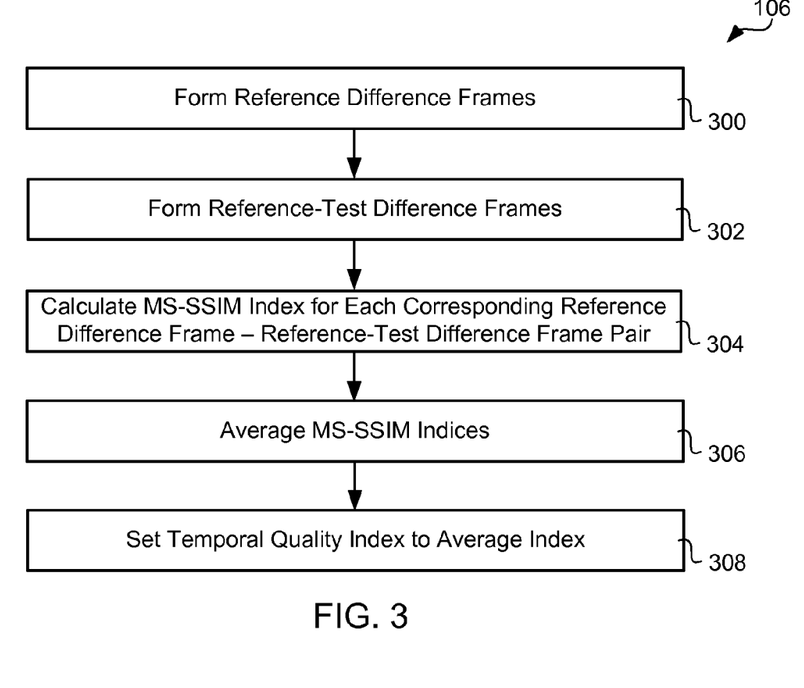
FIG. 3 is a chart showing exemplary embodiments of the present invention comprising calculating multi-scale structural similarity (MS-SSIM) indices for a plurality of reference difference frame and reference—test difference frame pairs and averaging the MS-SSIM index values to determine a temporal quality index.

The calculation 106 of the temporal quality index, in some embodiments of the present invention, may be understood in relation to FIG. 3. FIG. 3 illustrates exemplary method(s) 106 of temporal quality index calculation according to embodiments of the present invention. Reference difference frames, which may be denoted $D_{r,i}$, and reference—test difference frames, which may be denoted $D_{d,i}$ may be formed 300, 302 according to:

$$D_{r,i} = f_{r,i+1} - f_{r,i}$$

and $$D_{d,i} = f_{d,i+1} - f_{r,i},$$

respectively, where $f_{r,i}$ and $f_{r,i+1}$ may denote temporally adjacent frames within the reference video sequence and $f_{d,i+1}$ may denote the test frame temporally corresponding to reference frame $f_{r,i+1}$, and wherein i may be a temporal index. An MS-SSIM index may calculated 304 for each pair $(D_{d,i}, D_{r,i})$, where $i=1, \ldots, N-1$. The MS-SSIM index may be calculated according to the method described above. The MS-SSIM index associated with temporal index i may be denoted $T_i$, and the N−1 MS-SSIM indices may be, in some embodiments of the present invention, averaged 306 and the temporal quality index, which may be denoted $Q_T$, may be set 308 to the average index:

$$Q_T = \frac{\left(\sum_{i=1}^{N-1} T_i\right)}{N-1}.$$

In alternative embodiments, the N−1 MS-SSIM indices may be combined using a weighted average, an exponential weighting or another data fusion method known in the art.

Referring to FIG. 1, the spatial quality index, $Q_S$, and the temporal quality index, $Q_T$, may be combined 108 to generate a final quality index, which may be denoted Q, for the test video sequence. In some embodiments of the present invention, the spatial quality index, $Q_S$, and the temporal quality index, $Q_T$, may be combined 108 according to:

$$Q = \frac{(Q_S + Q_T)}{2}.$$

In alternative embodiments, the spatial quality index, $Q_S$, and the temporal quality index, $Q_T$, may be combined using a weighted average, an exponential weighting or another data fusion method known in the art.

The final quality index, Q, may be a value in the range of zero to one, wherein a video sequence with a larger final quality index value may correspond to a visibly higher quality video sequence than a video sequence a smaller final quality index value.

Figure 4:
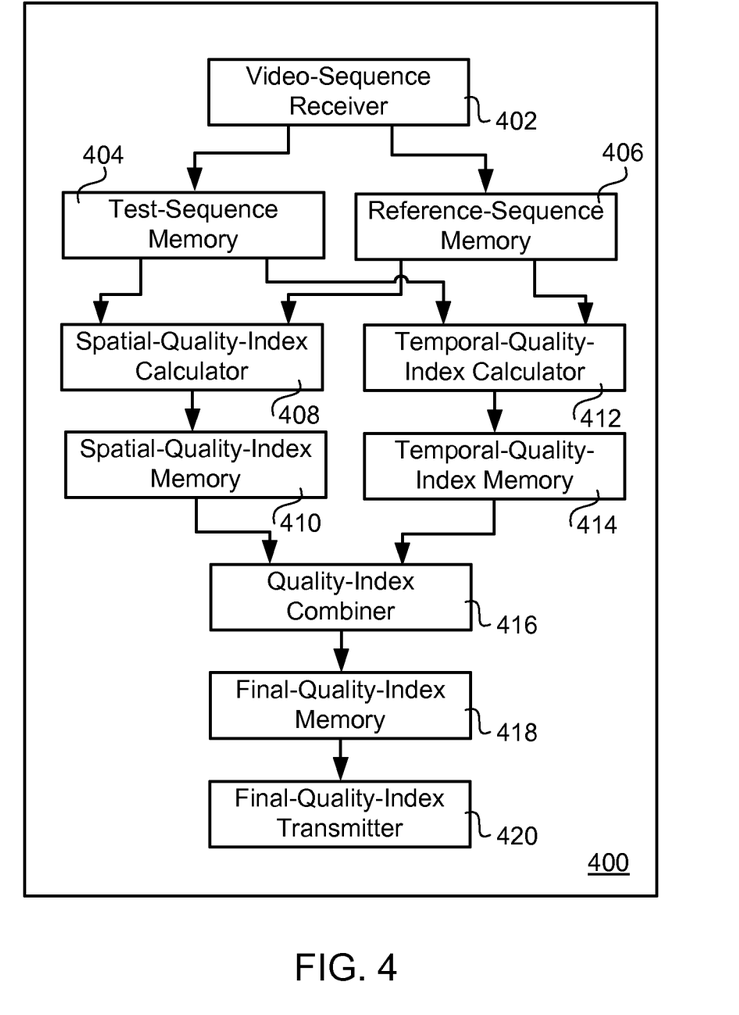
FIG. 4 is a picture depicting exemplary embodiments of the present invention comprising a spatial-quality-index calculator, a temporal-quality-index calculator and a quality-index combiner for combining a spatial quality index and a temporal quality index.

Some embodiments of the present invention, described in relation to FIG. 4, may comprise a system 400 for computing a quality index for a test video sequence. The system 400 may comprise a video-sequence receiver 402 for receiving a test video sequence and a reference video sequence corresponding to the test video sequence. The video-sequence receiver 402 may store the test video sequence in a test-sequence memory 404 and the reference video sequence in a reference-sequence memory 406. The test video sequence and the reference video sequence may be made available to a spatial-quality-index calculator 408 and a temporal-quality-index calculator 412 from the test-sequence memory 404 and the reference-sequence memory 406, respectively. The spatial-quality-index calculator 408 may calculate a spatial quality index which may be stored in a spatial-quality-index memory 410, and the temporal-quality-index calculator 412 may calculate a temporal quality index which may be stored in a temporal-quality-index memory 414. The spatial quality index and the temporal quality index may be made available to a quality-index combiner 416 from the spatial-quality-index memory 410 and the temporal-quality-index memory 414, respectively. The quality-index combiner 416 may combine the spatial quality index and the temporal quality index to form a final quality index which may stored in a final-quality-index memory 418. A final-quality-index transmitter 420 may make the final quality index stored in the final-quality-index memory 418 available to other processes and/or systems.

Figure 5:
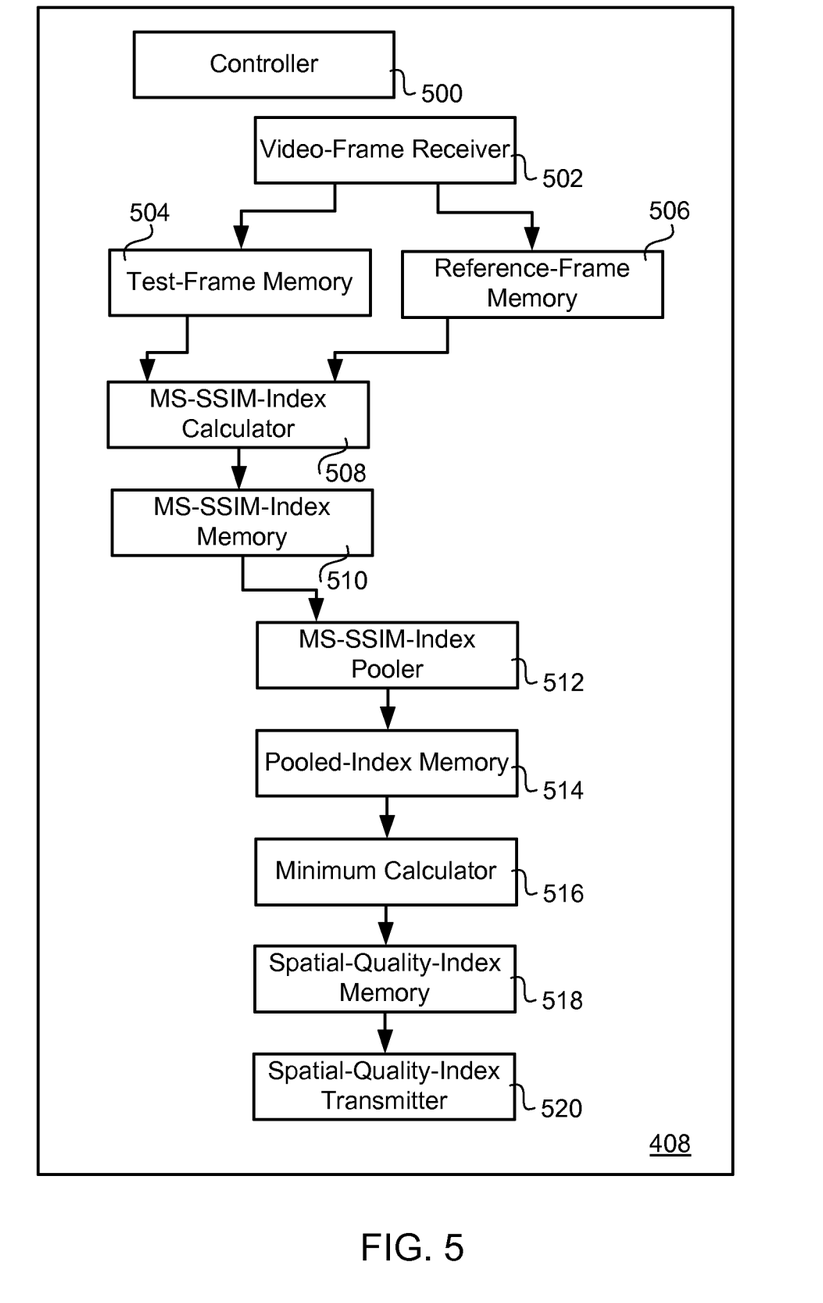
FIG. 5 is a picture depicting exemplary embodiments of a spatial-quality-index calculator according to the present invention.

The spatial-quality-index calculator 408 may be understood in relation to FIG. 5. FIG. 5 illustrates exemplary embodiments, according to the present invention, of the spatial-quality-index calculator 408. The spatial-quality-index calculator 408 may comprise a controller 500 for controlling the processing flow. The spatial-quality-index calculator 408 may comprise a video-frame receiver 502 which may be controlled by the controller 500 to receive a test frame and temporally corresponding reference frame pair. The test frame may be written to a test-frame memory 504, and the temporally corresponding reference frame may be written to a reference-frame memory 506. The test frame—reference frame pair may be made available from the test-frame memory 504 and the reference-frame memory 506 to a multi-scale structural similarity (MS-SSIM)—index calculator 508. The MS-SSIM-index calculator 508 may calculate an MS-SSIM index for the test frame—reference frame pair, and the MS-SSIM index may be written to an MS-SSIM-index memory 510, and the MS-SSIM index may be made available from the MS-SSIM-index memory 510 to an MS-SSIM-index pooler 512. The controller 500 may control the data flow so that each test frame and temporally corresponding reference frame may be processed, and an MS-SSIM-index calculated for each frame pair. When a sufficient number of MS-SSIM indices are available to the MS-SSIM-index pooler 512, a plurality of MS-SSIM indices may be pooled, and the pooled index value may be written to a pooled-index memory 514. The controller may control the initiation of pooling based on the number of available MS-SSIM indices.

In some embodiments of the present invention, the MS-SSIM indices may be pooled using a modified exponential moving average. An initial spatial quality value, which may be denoted $S_1$, may be computed according to:

$$S_1 = \frac{\left(\sum_{i=1}^{p} MSSSIM_i\right)}{p},$$

where $MSSSIM_i$ denotes the MS-SSIM index of the $i^{th}$ temporally located reference frame—test frame pair. For n=1, 2, ..., N−p, where N is the number of frames in each the test video sequence and the reference video sequence, $S_{n+1}$ may be computed according to:

$$S_{n+1} = \alpha MSSSIM_{n+p} + (1-\alpha)S_n,$$

where $\alpha$ is a smoothing factor which may be, in an exemplary embodiment of the present invention, selected according to:

$$\alpha = \frac{\eta}{(p+1)},$$

where $\eta=0.25$ and $p=30$. In some embodiments of the present invention, each $S_n$ may contain information from, at least, half a second of the video, and in each $S_n$, a new frame may not make an immediate strong effect and the contribution of previous frames may not drop too fast. In some embodiments of the present invention, setting $p=30$ and $\alpha$ to a small value may achieve the above-described three constraints on $S_n$.

A minimum calculator 516 may determine a minimum spatial quality value from the spatial quality values available in the pooled-index memory 514, and the minimum spatial quality value may be written to a spatial-quality-index memory 518. A spatial-quality-index transmitter 520 may make the spatial quality index stored in the spatial-quality-index memory 518 available to other processes and/or systems.

The controller 500 may control the data flow and process initiation of the components of the spatial-quality-index calculator 408. In some embodiments, the flow may be purely sequential. In alternative embodiments, the flow may partially concurrent. In yet alternative embodiments, the flow may substantially concurrent.

Figure 6:
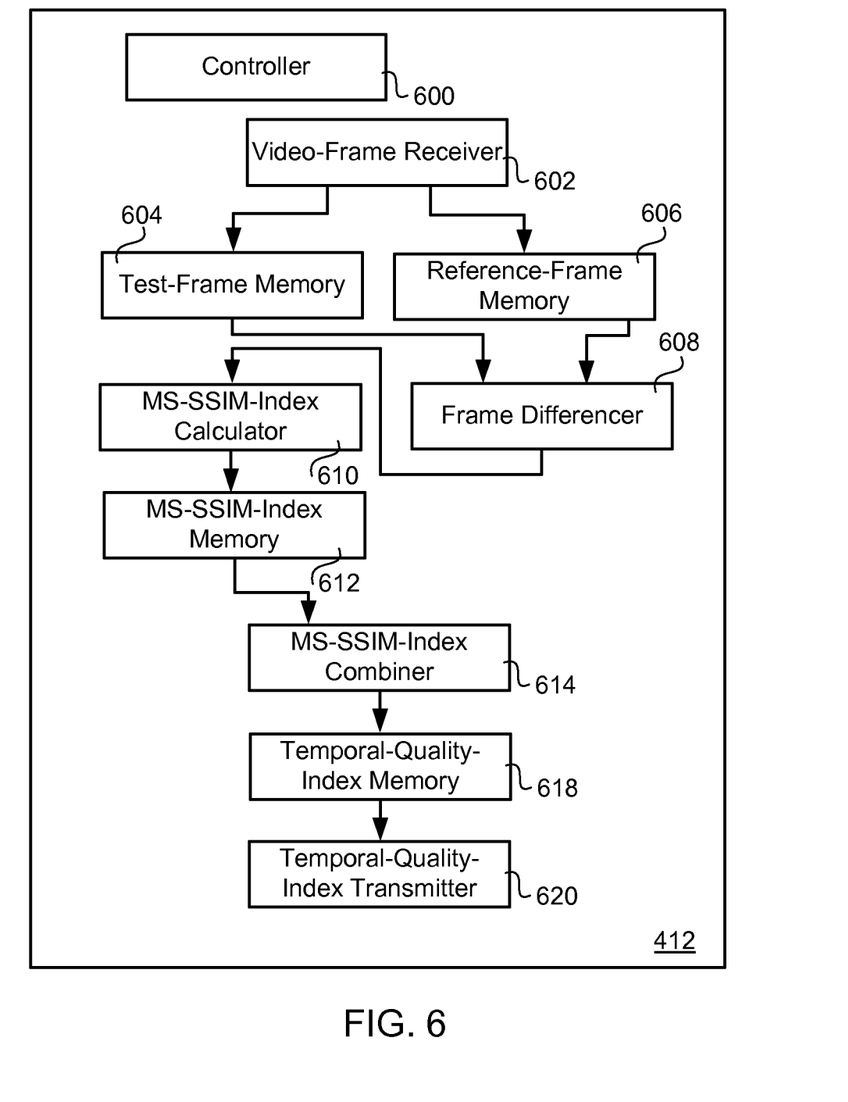
FIG. 6 is a picture depicting exemplary embodiments of a temporal-quality-index calculator according to the present invention.

The temporal-quality-index calculator 412 may be understood in relation to FIG. 6. FIG. 6 illustrates exemplary embodiments, according to the present invention, of the temporal-quality-index calculator 412. The temporal-quality-index calculator 412 may comprise a controller 600 for controlling the processing flow. The temporal-quality-index calculator 412 may comprise a video-frame receiver 602 which may be controlled by the controller 600 to receive a test frame and temporally corresponding reference frame pair. The test frame may be written to a test-frame memory 604, and the temporally corresponding reference frame may be written to a reference-frame memory 606. The immediately temporally previous reference frame may be received by the video-frame receiver 602 and may be written to the reference-frame memory 606. A frame difference 608 may form two difference frames according to:

$$D_{r,i} = f_{r,i+1} - f_{r,i}$$

and $$D_{d,i} = f_{d,i+1} - f_{r,i},$$

where $f_{r,i}$ and $f_{r,i+1}$ may denote the temporally adjacent frames within the reference video sequence and $f_{d,i+1}$ may denote the test frame temporally corresponding to reference frame $f_{r,i+1}$ and wherein i may be a temporal index. The test frame and the reference frames may be made available to the frame difference from the test-frame memory 604 and the reference-frame memory 606, respectively. An MS-SSIM index may calculated by an MS-SSIM-index calculator 610 for the frame pair $(D_{d,i}, D_{r,i})$. The MS-SSIM index may be written to an MS-SSIM index memory 612. An MS-SSIM-index combiner 614 may combine the MS-SSIM indices for all frame pairs $(D_{d,i}, D_{r,i})$, where i=1, ..., N−1 and N denotes the number of frames in the test video sequence. The MS-SSIM-index combiner 614 may, in some embodiments of the present invention, average the N−1 MS-SSIM indices to form the temporal quality index, which may be denoted $Q_T$, according to:

$$Q_T = \frac{\left(\sum_{i=1}^{N-1} T_i\right)}{N-1},$$

where $T_i$ may denote the MS-SSIM index associated with the frame pair $(D_{d,i}, D_{r,i})$.

In alternative embodiments, the N−1 MS-SSIM indices may be combined using a weighted average, an exponential weighting or another data fusion method known in the art.

The temporal quality index may be written to a temporal-quality-index memory 618 and may be made available to other processes and/or systems by a temporal-quality-index transmitter 620.

The controller 600 may control the data flow and process initiation of the components of the temporal-quality-index calculator 412. In some embodiments, the flow may be purely sequential. In alternative embodiments, the flow may partially concurrent. In yet alternative embodiments, the flow may substantially concurrent.

Referring to FIG. 4, in some embodiments of the present invention, the quality-index combiner 416 may combine the spatial quality index, which may be denoted $Q_S$, and the temporal quality index, which may be denoted $Q_T$, to generate the final quality index, which may be denoted Q, for the test video sequence, according to:

$$Q = \frac{(Q_S + Q_T)}{2}.$$

In alternative embodiments, the spatial quality index, $Q_S$, and the temporal quality index, $Q_T$, may be combined in the quality-index combiner 416 using a weighted average, an exponential weighting or another data fusion method known in the art.

The final quality index, Q, may be a value in the range of zero to one, wherein a video sequence with a larger final quality index value may correspond to a visibly higher quality video sequence than a video sequence a smaller final quality index value.

Some embodiments of the present invention may comprise a video processing apparatus in which the above described methods and/or systems may be embodied. Exemplary video processing apparatus may be video test devices, video encoders, video decoders and other apparatus in which a measurement of video quality may be required.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for determining a quality index for a test video sequence, said method comprising:
   receiving, in a processor, a test video sequence, wherein said test video sequence comprises a first plurality of image values;
   receiving, in said processor, a reference video sequence corresponding to said test video sequence, wherein said reference video sequence comprises a second plurality of image frames;
   in said processor, calculating a spatial quality index using said test video sequence and said reference video sequence, wherein said calculating a spatial quality index comprises:
      calculating a multi-scale structural similarity (MS-SSIM) index for each image frame in said first plurality of image frames and a temporally corresponding image frame in said second plurality of image frames, thereby producing a plurality of MS-SSIM indices;
      pooling said plurality of MS-SSIM indices, thereby producing a plurality of pooled MS-SSIM indices;
      determining a minimum value from said plurality of pooled MS-SSIM indices: and
      setting said spatial quality index to said minimum value;
   in said processor, calculating a temporal quality index using said test video sequence and said reference video sequence; and
   in said processor, combining said spatial quality index and said temporal quality index to form a final quality index for said test video sequence.

2. A method as described in claim 1, wherein said test video sequence is a degraded version of said reference video sequence, a processed version of said reference video sequence or a previously compressed version of said reference video sequence.

3. A method as described in claim 1, wherein said combining comprises averaging said spatial quality index and said temporal quality index.

4. A method as described in claim 1, wherein said pooling said plurality of MS-SSIM indices comprises:
   calculating an initial pooled MS-SSIM index by averaging a first plurality of said MS-SSIM indices in said plurality of MS-SSIM indices, wherein said first plurality of said MS-SSIM indices corresponds to a temporally initial portion of said MS-SSIM indices in said plurality of MS-SSIM indices;
   calculating a first subsequent pooled MS-SSIM index by forming a linear combination of said initial pooled MS-SSIM index and a first next MS-SSIM index, wherein said first next MS-SSIM index is an immediately temporally subsequent MS-SSIM index to said temporally initial portion of said MS-SSIM indices in said plurality of MS-SSIM indices; and
   calculating a second subsequent pooled MS-SSIM index by forming a linear combination of said first subsequent pooled MS-SSIM index and a second next MS-SSIM index, wherein said second next MS-SSIM index is an immediately temporally subsequent MS-SSIM index to said first next MS-SSIM index in said plurality of MS-SSIM indices.

5. A method as described in claim 4, wherein said initial portion of said MS-SSIM indices is associated with a portion of video at least one-half second in length.

6. A method as described in claim 4, wherein:
   said calculating a temporal quality index comprises:
      forming a first reference difference image between a first image frame in said second plurality of image frames and a second image frame in said second plurality of image frames, wherein said second image frame is an immediately temporally previous image frame to said first image frame in said second plurality of image frames;
      forming a first test difference image between a test image frame in said first plurality of image frames, wherein said test image frame corresponds temporally to said first image frame, and said second image frame;
      calculating a difference-frames multi-scale structural similarity (MS-SSIM) index using said first reference difference image and said first test difference image; and
      averaging said difference-frames MS-SSIM index with a plurality of previously calculated difference-frames MS-SSIM indices.

7. A method as described in claim 6, wherein said combining comprises averaging said spatial quality index and said temporal quality index.

8. A method as described in claim 1, wherein:
   said calculating a temporal quality index comprises:
      forming a first reference difference image between a first image frame in said second plurality of image frames and a second image frame in said second plurality of image frames, wherein said second image frame is an immediately temporally previous image frame to said first image frame in said second plurality of image frames;
      forming a first test difference image between a test image frame in said first plurality of image frames, wherein said test image frame corresponds temporally to said first image frame, and said second image frame;
      calculating a difference-frames multi-scale structural similarity (MS-SSIM) index using said first reference difference image and said first test difference image; and
      averaging said difference-frames MS-SSIM index with a plurality of previously calculated difference-frames MS-SSIM indices.

9. A method for determining a quality index for a test video sequence, said method comprising:
   receiving, in a processor, a test video sequence, wherein said test video sequence comprises a first plurality of image frames;

receiving, in said processor, a reference video sequence corresponding to said test video sequence, wherein said reference video sequence comprises a second plurality of image frames;

in said processor, calculating a spatial quality index using said test video sequence and said reference video sequence;

in said processor, calculating a temporal quality index using said test video sequence and said reference video sequence, wherein and said calculating a temporal quality index comprises:

forming a first reference difference image between a first image frame in said second plurality of image frames and a second image frame in said second plurality of image frames, wherein said second image frame is an immediately temporally previous image frame to said first image frame in said second plurality of image frames;

forming a first test difference image between a test image frame in said first plurality of image frames, wherein said test image frame corresponds temporally to said first image frame, and said second image frame;

calculating a multi-scale structural similarity (MS-SSIM) index using said first reference difference image and said first test difference image; and averaging said MS-SSIM index with a plurality of previously calculated MS-SSIM indices. and in said processor, combining said spatial quality index and said temporal quality index to form a final quality index for said test video sequence.

10. A method for determining a quality index for a test video sequence, said method comprising:

receiving, in a processor, a test video sequence, wherein said test video sequence comprises a first plurality of image frames;

receiving, in said processor, a reference video sequence corresponding to said test video sequence, wherein said reference video sequence comprises a second plurality of image frames; and in said processor, calculating a spatial quality index using said test video sequence and said reference video sequence, wherein said calculating comprises:

calculating a multi-scale structural similarity (MS-SSIM) index for each image frame in said first plurality of image frames and a temporally corresponding image frame in said second plurality of image frames, thereby producing a plurality of MS-SSIM indices;

pooling said plurality of MS-SSIM indices, thereby producing a plurality of pooled MS-SSIM indices;

determining a minimum value from said plurality of pooled MS-SSIM indices; and setting said spatial quality index to said minimum value.

11. A method as described in claim 10, wherein said pooling said plurality of MS-SSIM indices comprises:

calculating an initial pooled MS-SSIM index by averaging a first plurality of said MS-SSIM indices in said plurality of MS-SSIM indices, wherein said first plurality of said MS-SSIM indices corresponds to a temporally initial portion of said MS-SSIM indices in said plurality of MS-SSIM indices;

calculating a first subsequent pooled MS-SSIM index by forming a linear combination of said initial pooled MS-SSIM index and a first next MS-SSIM index, wherein said first next MS-SSIM index is an immediately temporally subsequent MS-SSIM index to said temporally initial portion of said MS-SSIM indices in said plurality of MS-SSIM indices; and calculating a second subsequent pooled MS-SSIM index by forming a linear combination of said first subsequent pooled MS-SSIM index and a second next MS-SSIM index, wherein said second next MS-SSIM index is an immediately temporally subsequent MS-SSIM index to said first next MS-SSIM index in said plurality of MS-SSIM indices.

12. A method as described in claim 11, wherein said initial portion of said MS-SSIM indices is associated with a portion of video at least one-half second in length.

13. A method as described in claim 10 further comprising combining said spatial quality index with a temporal quality index.

14. A method as described in claim 13, wherein said combining comprises averaging said spatial quality index and said temporal quality index.

15. A method as described in claim 10, wherein said test video sequence is a degraded version of said reference video sequence, a processed version of said reference video sequence or a previously compressed version of said reference video sequence.

16. A method for determining a quality index for a test video sequence, said method comprising:

receiving, in a processor, a test video sequence, wherein said test video sequence comprises a first plurality of image frames;

receiving, in said processor, a reference video sequence corresponding to said test video sequence, wherein said reference video sequence comprises a second plurality of image frames; and in said processor, calculating a temporal quality index using said test video sequence and said reference video sequence, wherein said calculating comprises;

forming a first reference difference image between a first image frame in said second plurality of image frames and a second image frame in said second plurality of image frames, wherein said second image frame is an immediately temporally previous image frame to said first image frame in said second plurality of image frames;

forming a first test difference image between a test image frame in said first plurality of image frames, wherein said test image frame corresponds temporally to said first image frame, and said second image frame;

calculating a multi-scale structural similarity (MS-SSIM) index using said first reference difference image and said first test difference image; and averaging said MS-SSIM index with a plurality of previously calculated MS-SSIM indices.

17. A method as described in claim 16 further comprising combining said temporal quality index with a spatial quality index.

18. A method as described in claim 17, wherein said combining comprises averaging said spatial quality index and said temporal quality index.

19. A method as described in claim 17, wherein said test video sequence is a degraded version of said reference video sequence, a processed version of said reference video sequence or a previously compressed version of said reference video sequence.

* * * * *